US008286154B2

(12) United States Patent
Kaakani et al.

(10) Patent No.: US 8,286,154 B2
(45) Date of Patent: Oct. 9, 2012

(54) APPARATUS AND METHOD FOR LIVE LOADING OF VERSION UPGRADES IN A PROCESS CONTROL ENVIRONMENT

(75) Inventors: Ziad M. Kaakani, Scottsdale, AZ (US); Vivek B. Varma, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 1540 days.

(21) Appl. No.: 11/386,388

(22) Filed: Mar. 22, 2006

(65) Prior Publication Data

US 2007/0226685 A1 Sep. 27, 2007

(51) Int. Cl.
*G06F 9/44* (2006.01)

(52) U.S. Cl. ........................................ 717/168; 717/166

(58) Field of Classification Search .................... 717/170
See application file for complete search history.

(56) References Cited

U.S. PATENT DOCUMENTS

| | | | | |
|---|---|---|---|---|
| 5,359,730 | A | * | 10/1994 | Marron ........................ 717/169 |
| 6,023,704 | A | * | 2/2000 | Gerard et al. ........................ 1/1 |
| 6,092,079 | A | * | 7/2000 | Gerard et al. ........................ 1/1 |
| 6,104,875 | A | * | 8/2000 | Gallagher et al. ............ 717/168 |
| 6,298,478 | B1 | | 10/2001 | Nally et al. |
| 6,360,363 | B1 | | 3/2002 | Moser et al. |
| 6,501,995 | B1 | * | 12/2002 | Kinney et al. ...................... 700/1 |
| 7,533,377 | B2 | * | 5/2009 | Appavoo et al. .............. 717/168 |
| 2003/0191870 | A1 | | 10/2003 | Duggan |
| 2007/0061372 | A1 | * | 3/2007 | Appavoo et al. .............. 707/200 |

OTHER PUBLICATIONS

Dynamic Software Updating Michael Hicks and Jonathan T. Moore and Scott Nettles Proceedings of the {ACM} Conference on Programming Language Design and Implementation (PLDI) Jun. 2001 pp. 13-23.*
Implementing On-line Software Upgrades in Java Martha Gebremichael University of Maryland, College Park May 2003.*
A Review of Software Upgrade Techniques for Distributed Systems Sameer Ajmani MIT Computer Science and Articial Intelligence Laboratory First Draft: Aug. 7, 2002; Last Modied: Nov. 7, 2004.*
The Architecture of a Dynamically Updatable, Component-based System Robert Pawel Bialek Proceedings of the 26 th Annual International Computer Software and Applications Conference (COMPSAC'02) Mar. 2002.*
Evolving Dependable Real-Time Systems Lui Sha, Ftagunathan Rajkumar and Michael Gagliarcii Gmegie Mellon University Software Engineering Institute Year of publication 1996.*
Schema Evolution in Persistent Object Systems Ashok Malhotra and Steven J. Munroe Seventh International Workshop on Persistent Object Systems Published: May 1996.*

(Continued)

*Primary Examiner* — Emerson Puente
*Assistant Examiner* — Paul Mills (57) ABSTRACT

A method includes comparing a first layout of data elements associated with a first version of a class and a second layout of data elements associated with a second version of the class. The first and second versions of the class are associated respectively with first and second versions of assembly code. The method also includes updating method information in an existing object instance associated with the first version of the class if the first and second layouts are identical. In addition, the method includes creating a new object instance associated with the second version of the class and transferring one or more values of one or more data elements from the existing object instance to the new object instance when the first and second layouts are not identical.

21 Claims, 8 Drawing Sheets

OTHER PUBLICATIONS

Runtime Support for Type-Safe Dynamic Java Classes Scott Malabarba, Raju Pandey, Jeff Gragg, Earl Barr, and J. Fritz Barnes Published: 2000.*

Dynamic ML without Dynamic Types Stephen Gilmore, Dilsun Kirh, and Christopher Walton Published: Jun. 15, 1998.*

U.S. Appl. No. 11/252,183, Filed Oct. 17, 2005, Pekka M. Salpakari, "Apparatus and Method for Live Loading of Control Applications in a Process Control Environment".

Alexandre Vasseur, Dynamic AOP and Runtime Weaving for Java—How Does AspectWerkz Address it? [Online], Apr. 25, 2005, URL:http/web.archive.org/web/2005042510743, XP-002452626.

* cited by examiner

APPARATUS AND METHOD FOR LIVE LOADING OF VERSION UPGRADES IN A PROCESS CONTROL ENVIRONMENT

CROSS-REFERENCE TO RELATED APPLICATIONS

This application is related to the following U.S. patent applications:

Ser. No. 11/175,848 entitled "DETERMINISTIC RUNTIME EXECUTION ENVIRONMENT AND METHOD" filed on Jul. 6, 2005; and Ser. No. 11/175,703 entitled "APPARATUS AND METHOD FOR DETERMINISTIC GARBAGE COLLECTION OF A HEAP MEMORY" filed on Jul. 6, 2005;

both of which are hereby incorporated by reference.

TECHNICAL FIELD

This disclosure relates generally to computing systems and more specifically to an apparatus and method for live loading of version upgrades in a process control environment.

BACKGROUND

Processing facilities are often managed using process control systems. Example processing facilities include manufacturing plants, chemical plants, crude oil refineries, and ore processing plants. Among other operations, process control systems typically manage the use of motors, valves, and other industrial equipment in the processing facilities.

In conventional process control systems, various controllers are often used to control the operation of the industrial equipment in the processing facilities. The controllers could, for example, monitor the operation of the industrial equipment, provide control signals to the industrial equipment, and generate alarms when malfunctions are detected.

Conventional controllers often include function block algorithms or other control logic implementing the desired control functionality. Conventional controllers also often include a scheduler, which schedules or drives the execution of the control logic. For example, a scheduler could invoke or schedule execution of a function block algorithm once every twenty milliseconds. In general, the scheduler is often written by a manufacturer or vendor of a controller, while the control logic can be written by the manufacturer or vendor of the controller or by end users of the controller (such as industrial plant engineers).

For various reasons, it may become necessary or desirable to upgrade or improve the control logic in a conventional controller after installation in a process control system. This becomes challenging when an old version of the control logic is being executed by the conventional controller to control a process in a processing facility. For example, simply shutting down a conventional controller to load a new version of the control logic onto the controller would likely require shutting down an entire industrial process (a complex, time consuming, and expensive operation). Also, a switch-over from an old version of the control logic to a new version of the control logic often needs to occur within a short amount of time (such as tens of milliseconds). In addition, the switch-over often must include a transfer of data from object instances associated with the old version of the control logic to object instances associated with the new version of the control logic.

SUMMARY

This disclosure provides an apparatus and method for live loading of version upgrades in a process control environment.

In a first embodiment, a method includes comparing a first layout of data elements associated with a first version of a class and a second layout of data elements associated with a second version of the class. The first and second versions of the class are associated respectively with first and second versions of assembly code. The method also includes updating method information in an existing object instance associated with the first version of the class if the first and second layouts are identical. In addition, the method includes creating a new object instance associated with the second version of the class and transferring one or more values of one or more data elements from the existing object instance to the new object instance when the first and second layouts are not identical.

In particular embodiments, the existing object instance represents one of a plurality of existing object instances. Also, an executable program associated with the first and second versions of assembly code or a garbage collection process identifies the plurality of existing object instances.

In a second embodiment, an apparatus includes at least one memory capable of storing an existing object instance associated with a first version of a class. The first version of the class is associated with a first version of assembly code. The apparatus also includes at least one processor capable of comparing a first layout of data elements associated with the first version of the class and a second layout of data elements associated with a second version of the class. The second version of the class is associated with a second version of assembly code. The at least one processor is also capable of updating method information in the existing object instance if the first and second layouts are identical. In addition, the at least one processor is capable of creating a new object instance associated with the second version of the class and transferring one or more values of one or more data elements from the existing object instance to the new object instance when the first and second layouts are not identical.

In a third embodiment, a computer program is embodied on a computer readable medium and is operable to be executed by a processor. The computer program includes computer readable program code for comparing a first layout of data elements associated with a first version of a class and a second layout of data elements associated with a second version of the class. The first and second versions of the class are associated respectively with first and second versions of assembly code. The computer program also includes computer readable program code for updating method information in an existing object instance associated with the first version of the class if the first and second layouts are identical. In addition, the computer program includes computer readable program code for creating a new object instance associated with the second version of the class and transferring one or more values of one or more data elements from the existing object instance to the new object instance when the first and second layouts are not identical.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
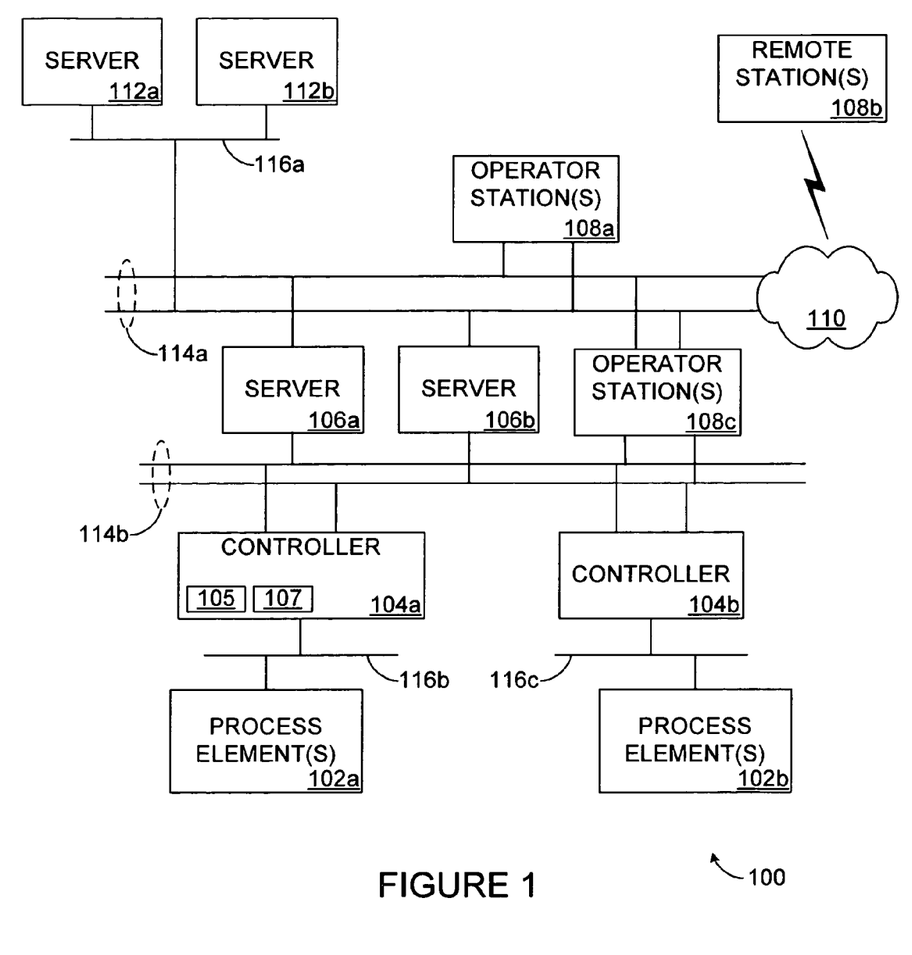
FIG. 1 illustrates an example process control system according to one embodiment of this disclosure.

FIG. 1 illustrates an example process control system 100 according to one embodiment of this disclosure. The embodiment of the process control system 100 shown in FIG. 1 is for illustration only. Other embodiments of the process control system 100 may be used without departing from the scope of this disclosure.

In this example embodiment, the process control system 100 includes one or more process elements 102a-102b. The process elements 102a-102b represent components in a process or production system that may perform any of a wide variety of functions. For example, the process elements 102a-102b could represent motors, catalytic crackers, valves, and other industrial equipment in a production environment. The process elements 102a-102b could represent any other or additional components in any suitable process or production system. Each of the process elements 102a-102b includes any hardware, software, firmware, or combination thereof for performing one or more functions in a process or production system.

Two controllers 104a-104b are coupled to the process elements 102a-102b. The controllers 104a-104b control the operation of the process elements 102a-102b. For example, the controllers 104a-104b could be capable of providing control signals to the process elements 102a-102b periodically. Each of the controllers 104a-104b includes any hardware, software, firmware, or combination thereof for controlling one or more of the process elements 102a-102b. The controllers 104a-104b could, for example, include one or more processors 105 and one or more memories 107 storing data and instructions used by the processor(s) 105. As particular examples, the processors 105 could include processors of the POWERPC processor family running the GREEN HILLS INTEGRITY operating system or processors of the X86 processor family running a MICROSOFT WINDOWS operating system.

Two servers 106a-106b are coupled to the controllers 104a-104b. The servers 106a-106b perform various functions to support the operation and control of the controllers 104a-104b and the process elements 102a-102b. For example, the servers 106a-106b could log information collected or generated by the controllers 104a-104b, such as status information related to the operation of the process elements 102a-102b. The servers 106a-106b could also execute applications that control the operation of the controllers 104a-104b, thereby controlling the operation of the process elements 102a-102b. In addition, the servers 106a-106b could provide secure access to the controllers 104a-104b. Each of the servers 106a-106b includes any hardware, software, firmware, or combination thereof for providing access to or control of the controllers 104a-104b. The servers 106a-106b could, for example, represent personal computers (such as desktop computers) executing a MICROSOFT WINDOWS operating system. As another example, the servers 106a-106b could include processors of the POWERPC processor family running the GREEN HILLS INTEGRITY operating system or processors of the X86 processor family running a MICROSOFT WINDOWS operating system.

One or more operator stations 108a-108b are coupled to the servers 106a-106b, and one or more operator stations 108c are coupled to the controllers 104a-104b. The operator stations 108a-108b represent computing or communication devices providing user access to the servers 106a-106b, which could then provide user access to the controllers 104a-104b and the process elements 102a-102b. The operator stations 108c represent computing or communication devices providing user access to the controllers 104a-104b (without using resources of the servers 106a-106b). As particular examples, the operator stations 108a-108c could allow users to review the operational history of the process elements 102a-102b using information collected by the controllers 104a-104b and/or the servers 106a-106b. The operator stations 108a-108c could also allow the users to adjust the operation of the process elements 102a-102b, controllers 104a-104b, or servers 106a-106b. Each of the operator stations 108a-108c includes any hardware, software, firmware, or combination thereof for supporting user access and control of the system 100. The operator stations 108a-108c could, for example, represent personal computers having displays and processors executing a MICROSOFT WINDOWS operating system.

In this example, at least one of the operator stations 108b is remote from the servers 106a-106b. The remote station is coupled to the servers 106a-106b through a network 110. The network 110 facilitates communication between various components in the system 100. For example, the network 110 may communicate Internet Protocol (IP) packets, frame relay frames, Asynchronous Transfer Mode (ATM) cells, or other suitable information between network addresses. The network 110 may include one or more local area networks (LANs), metropolitan area networks (MANS), wide area networks (WANs), all or a portion of a global network such as the Internet, or any other communication system or systems at one or more locations.

In this example, the system 100 includes two additional servers 112a-112b. The servers 112a-112b execute various applications to control the overall operation of the system 100. For example, the system 100 could be used in a processing or production plant or other facility, and the servers 112a-112b could execute applications used to control the plant or other facility. As particular examples, the servers 112a-112b could execute applications such as enterprise resource planning (ERP), manufacturing execution system (MES), or any other or additional plant or process control applications. Each of the servers 112a-112b includes any hardware, software, firmware, or combination thereof for controlling the overall operation of the system 100.

As shown in FIG. 1, the system 100 includes various redundant networks 114a-114b and single networks 116a-116c that support communication between components in the system 100. Each of these networks 114a-114b, 116a-116c represents any suitable network or combination of networks facilitating communication between components in the system 100. The networks 114a-114b, 116a-116c could, for example, represent Ethernet networks.

In one aspect of operation, control logic is implemented by the controllers 104a-104b to control the process elements 102a-102b. The control logic could represent function block algorithms or any other suitable logic. A function block algorithm represents an application having associated sub-applications formed from function blocks, where the application cycles through the function blocks and causes them to execute. The function block algorithm or other control logic may be associated with classes that are used to create object instances. The object instances are typically associated with both data elements and methods or behaviors. The current value(s) of data element(s) in an object instance may be referred to as the "state" of the object instance.

The controllers 104a-104b also implement a mechanism to upgrade from an old version of the control logic to a new version of the control logic. The new version of the control logic could make various changes to the classes that define the object instances, compared to the classes that were defined by the old version of the control logic. For example, the new version of the control logic could add, modify, or remove data elements in a class. In this document, the phrase "data element" refers to any individual unit of data (such as an integer, floating point value, character, or string) or combination of units (such as an array or data structure). The new version of the control logic could also add, modify, or delete methods in a class.

The mechanism for upgrading the control logic in the controllers 104a-104b supports the live loading of the new version of the control logic. This means that the controllers 104a-104b are capable of creating and/or updating object instances so that they are suitable for use with the new version of the control logic. For example, if the field or class layout of a class (its data elements) remains unchanged, the controllers 104a-104b may be capable of updating an object instance to identify new methods defined by the new version of the control logic. If the layout of a class changes, the controllers 104a-104b may be capable of creating new object instances and transferring state data from old object instances to the new object instances. In addition, the controllers 104a-104b may be capable of initializing new data elements in the new object instances and/or using conversion rules to transform data values from the old object instances prior to storage in the new object instances. The conversion rules represent logic identifying how data is transformed during a transfer, which may be useful in situations like when data is being transferred between two data elements that have somewhat different structures.

In this way, the controllers 104a-104b support the upgrading of control logic without the need to actually shut down the controllers 104a-104b or an entire industrial process. Also, the controllers 104a-104b may be capable of switching over from the old version of the control logic to the new version of the control logic within a relatively short amount of time (such as tens of milliseconds). In addition, the controllers 104a-104b may be capable of effectively transferring state data from old object instances to new object instances. The controllers 104a-104b may do this without requiring users to actually write program code to perform the state data transfers. The controllers 104a-104b may also do this without requiring classes to be compiled with specific attributes enabled (such as is required for techniques like serialization/deserialization), which means that users need not decide whether a live load will be necessary when they are writing programs.

In some embodiments, the controllers 104a-104b execute, support, or otherwise provide access to an execution environment. The execution environment provides support for various features that managed applications may use during execution. As examples, the execution environment could provide support for mathematical functions, input/output functions, and communication functions. The phrase "managed application" refers to an application executed in the execution environment, where the execution of the application is managed by the execution environment. A managed application could include the control logic needed to control one or more process elements 102a-102b.

In particular embodiments, the execution environment used in the controllers 104a-104b to execute the managed applications is deterministic. A deterministic execution environment is an execution environment whose behavior is predictable or that can be precisely specified. The execution environment could be implemented in any suitable manner, such as by using NET programming based on the Common Language Interface (CLI) specification as ratified by ECMA-335 and support both the Kernel and Compact profiles. In these embodiments, the deterministic execution environment may support the live loading of a new version of control logic in a deterministic fashion. Additional information about an example deterministic execution environment may be found in the two patent applications incorporated by reference above.

Although FIG. 1 illustrates one example of a process control system 100, various changes may be made to FIG. 1. For example, a control system could include any number of process elements, controllers, servers, and operator stations. Also, FIG. 1 illustrates one operational environment in which the live loading of version upgrades could be used. The live loading mechanism could be used in any other suitable process control or non-process control device or system.

Figure 2:
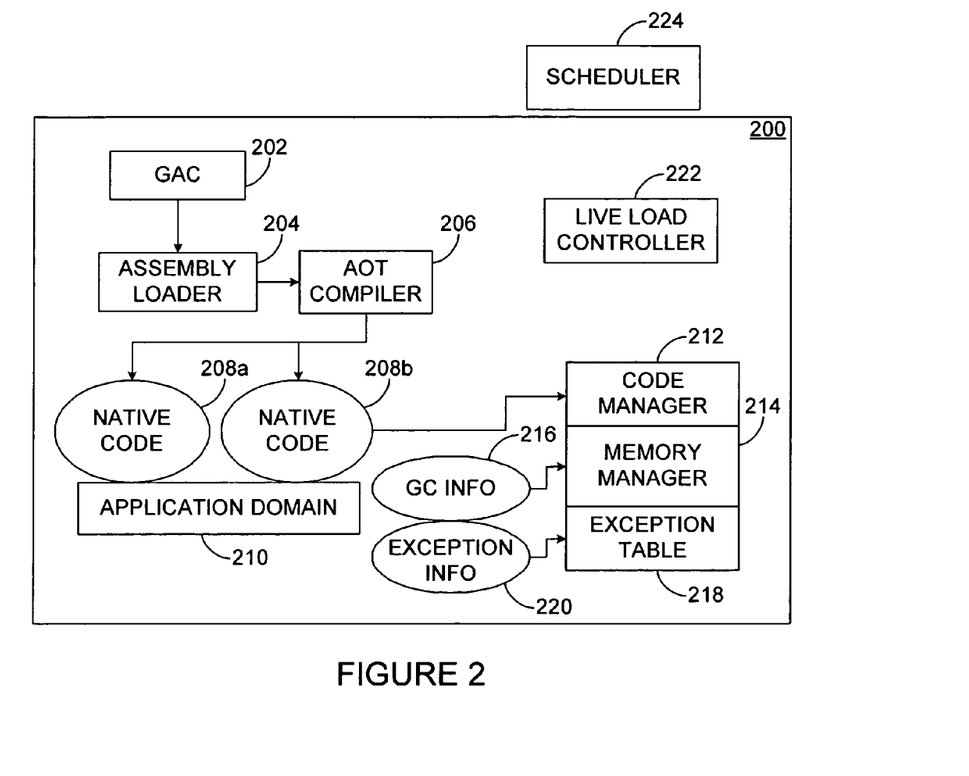
FIG. 2 illustrates an example execution environment according to one embodiment of this disclosure.

FIG. 2 illustrates an example execution environment 200 according to one embodiment of this disclosure. The embodiment of the execution environment 200 shown in FIG. 2 is for illustration only. Other embodiments of the execution environment could be used without departing from the scope of this disclosure. Also, for ease of explanation, the execution environment 200 is described as being implemented in the controllers 104a-104b of FIG. 1, although the execution environment 200 could be used in any other suitable device or system.

In this example embodiment, the execution environment 200 includes a global assembly cache (GAC) 202. The global assembly cache 202 represents a memory capable of storing different assembly code programs to be executed in the execution environment 200. The assembly code programs could represent assembly code versions of function block algorithms or other control logic for controlling one or more of the process elements 102a-102b of FIG. 1. The assembly code version of a function block algorithm or other control logic may be referred to as "assembly control logic." The global assembly cache 202 could store multiple assembly code programs and/or different versions of the same assembly code program. The global assembly cache 202 represents any suitable storage and retrieval device or devices. Assembly control logic could include program code and possibly metadata that describes one or more attributes of the assembly control logic and its program code. In some embodiments, an application may register in the execution environment 200 and receive a notification whenever assembly control logic is stored in a specified location in the global assembly cache 202.

An assembly loader 204 loads assembly code into the execution environment 200 for execution. For example, the assembly loader 204 may retrieve new assembly code downloaded into the global assembly cache 202. The assembly loader 204 may then load the identified assembly code into a compiler for compilation and use in the execution environment 200. The assembly loader 204 includes any hardware, software, firmware, or combination thereof for loading assembly code for compilation. The assembly loader 204 could, for example, represent a software thread executed in the background of the execution environment 200.

An ahead-of-time (AOT) compiler 206 compiles the assembly code loaded by the assembly loader 204. The AOT compiler 206 represents a load-time compiler that compiles assembly code when the assembly code is loaded. For example, the AOT compiler 206 may convert assembly code from an intermediate language to native executable code capable of being executed in the execution environment 200. Also, the AOT compiler 206 could insert instructions into the native executable code to ensure proper execution of the code in the execution environment 200. The AOT compiler 206 includes any hardware, software, firmware, or combination thereof for compiling assembly code. The AOT compiler 206 could, for example, represent a software thread executed in the background of the execution environment 200.

The AOT compiler 206 produces native executable code, such as native executable codes 208a-208b. The native executable codes 208a-208b represent executable code capable of being executed in the execution environment 200. The native executable codes 208a-208b could provide any suitable functionality in the execution environment 200. For example, the native executable codes 208a-208b could represent executable versions of assembly control logic used to control one or more process elements 102a-102b of FIG. 1. The native executable codes 208a-208b could provide any other or additional functionality in the execution environment 200.

One or more application domains 210 represent the domains in which the native executable codes 208a-208b are executed in the execution domain 200. Each application domain 210 represents any suitable domain for executing one or more native executable codes 208a-208b. While shown as a single application domain 210 in FIG. 2, multiple application domains 210 could be used.

The assembly codes and native executable codes in the execution environment 200 are managed by a code manager 212. For example, the code manager 212 may control the loading and unloading of assembly code into and out of the execution environment 200. As a particular example, the code manager 212 could cause the assembly loader 204 to load assembly code into the AOT compiler 206, which generates native executable code that is loaded into the application domain 210. The code manager 212 could also unload native executable code from the application domain 210. The code manager 212 includes any hardware, software, firmware, or combination thereof for managing assembly code and/or compiled code used in the execution environment 200. The code manager 212 could, for example, represent a software thread executed in the background of the execution environment 200.

The execution environment 200 also includes a memory manager 214. The memory manager 214 manages the use of memory, such as a heap memory. For example, the memory manager 214 could allocate blocks of memory to managed applications being executed in an application domain 210. The memory manager 214 could also use garbage collection information 216 to release blocks of memory that are no longer being used by the managed applications. The garbage collection information 216 could, for example, be generated by a garbage collection process provided by the memory manager 214 and executed in the background of the execution environment 200. Additional information about an example garbage collection process may be found in the two patent applications incorporated by reference above. In addition, the memory manager 214 could support a defragmentation process for the memory. The defragmentation process could be used to combine unused blocks of memory into larger blocks. The memory manager 214 includes any hardware, software, firmware, or combination thereof for managing memory. The memory manager 214 could, for example, represent a deterministic memory manager. The memory manager 214 could also represent a software thread executed in the background of the execution environment 200. In some embodiments, an application may register in the execution environment 200 and receive a notification whenever the memory manager 214 completes an operation, such as a garbage collection process.

The execution environment 200 further includes an exception table 218, which stores exception information 220. The exception information 220 identifies various problems experienced in the execution environment 200. Example problems could include attempting to load assembly code that does not exist in an explicitly specified location or in the global assembly cache 202, an error during compilation of loaded assembly code, or attempting to unload assembly code not previously loaded. An application or process being executed in the execution environment 200 could generate an exception identifying a detected problem. The exception is identified by the exception information 220, which is stored in the exception table 218 for later use (such as during debugging) or for use by the application or process for automatic recovery at runtime.

In addition, the execution environment 200 includes a live load controller 222. The live load controller 222 supports the updating of existing object instances and/or the creation of new object instances for a new version of control logic executed in the execution environment 200. For example, the live load controller 222 could determine if old and new versions of control logic define a class having the same class layout, meaning both versions define the same data elements for the class. If so, the live load controller 222 could determine that only the methods in the class have changed, and the live load controller 222 could update existing object instances to identify the new methods. If not, the live load controller 222 could create new object instances and transfer the state data from the old object instances to the new object instances. The live load controller 222 includes any hardware, software, firmware, or combination thereof for supporting the live loading of control logic. The live load controller 222 could, for example, represent a software thread executed in the background of the execution environment 200. In some embodiments, assembly control logic could represent a dynamic link library (a DLL or ".dll") or other file, and an application that executes or uses the assembly control logic could represent an executable (".exe") or other file. In particular embodiments, updating the control logic could involve updating the .dll file without altering the .exe file.

A scheduler 224 is used to schedule execution of the control logic and other managed applications. The scheduler 224 may also be used to schedule execution of housekeeping tasks in the execution environment 200. The housekeeping tasks include, among other things, memory management, assembly loading and unloading, assembly compilation, and live loading. For example, the scheduler 224 could support time slicing to allow multiple threads to be executed, where the threads represent the housekeeping tasks and the managed applications. The scheduler 224 includes any hardware, software, firmware, or combination thereof for scheduling the execution of applications and other tasks. In particular embodiments, a single scheduler 224 could be associated with one or multiple dynamic link libraries (".dll" files) or other control logic.

In some embodiments, the various components shown in FIG. 2 operate over a platform/operating system abstraction layer. The platform/operating system abstraction layer logically separates the execution environment 200 from the underlying hardware platform or operating system. In this way, the execution environment 200 may be used with different hardware platforms and operating systems without requiring the execution environment 200 to be specifically designed for a particular hardware platform or operating system.

Although FIG. 2 illustrates one example of an execution environment 200, various changes may be made to FIG. 2. For example, the functional division shown in FIG. 2 is for illustration only. Various components in FIG. 2 could be combined or omitted and additional components could be added according to particular needs.

Figure 3:
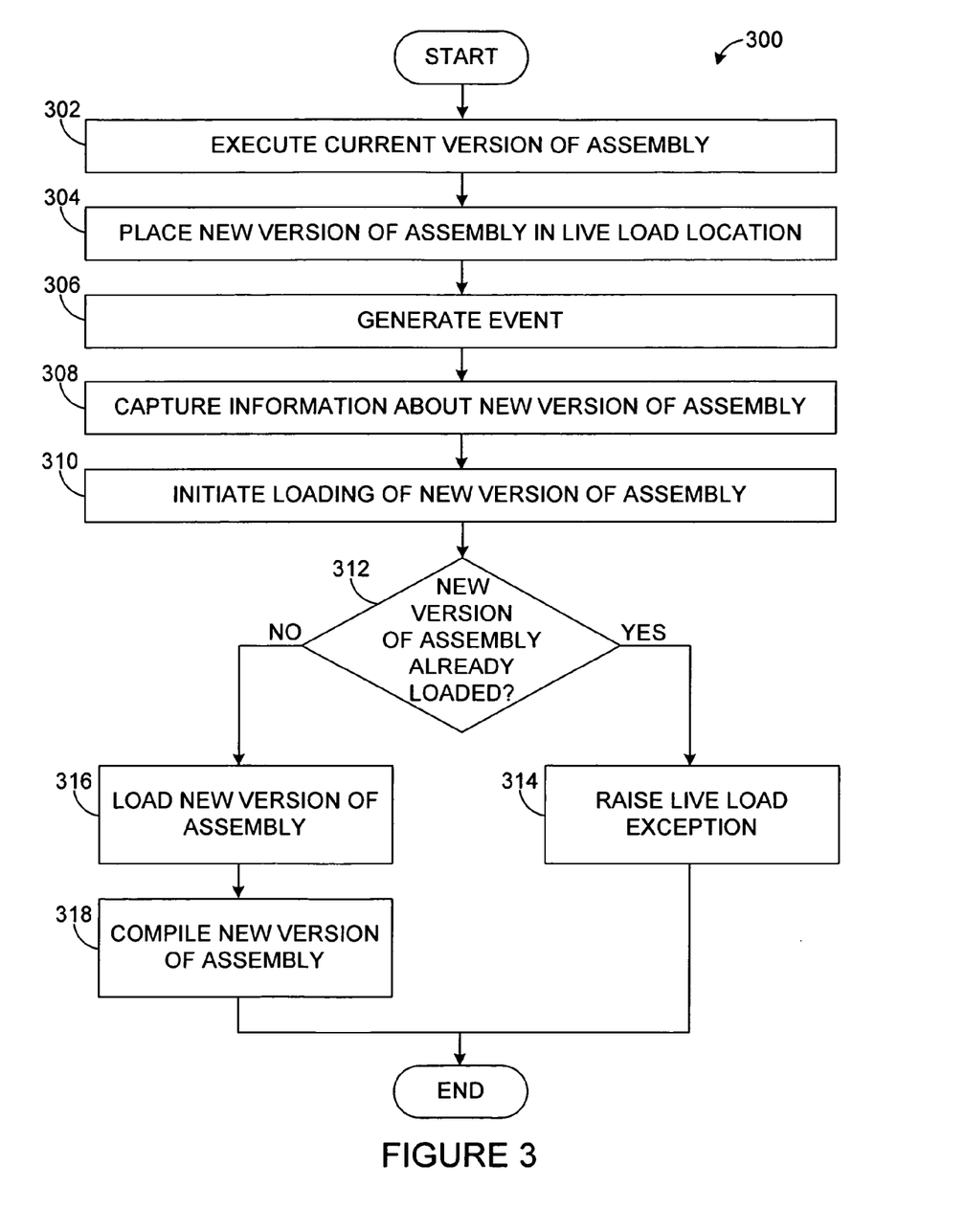
FIG. 3 illustrates an example method for preparing for a live load of a version upgrade in a process control environment according to one embodiment of this disclosure.

FIG. 3 illustrates an example method 300 for preparing for a live load of a version upgrade in a process control environment according to one embodiment of this disclosure. For ease of explanation, the method 300 is described with respect to the controller 104a in the process control system 100 of FIG. 1 operating using the execution environment 200 of FIG. 2. The method 300 could be used by any other suitable device and in any other suitable system.

The controller 104a executes one version of assembly control logic at step 302. This may include, for example, the controller 104a executing one or more native executable codes 208a-208b that correspond to a current version of assembly control logic stored in the global assembly cache 202. The one or more native executable codes 208a-208b may represent an executable program (an .exe program) that operates using one version of a DLL assembly.

A new version of the assembly control logic is placed into a designated live load location at step 304. The designated live load location may represent a location in a file system (such as a directory) that is designated to receive code to be used during a live load. As a particular example, this could include a user downloading the new version of the assembly control logic into a specified location in the global assembly cache 202.

An event is generated at step 306. In some embodiments, an internal thread monitors the designated live load location and raises an event when assembly code is loaded into the designated live load location. As noted above, the executable program may register with the execution environment 200 to receive this event. In particular embodiments, the event identifies the name and version number of the new version of the assembly control logic.

The controller 104a captures information about the new version of the assembly control logic at step 308. This may include, for example, the executable program receiving the name and version number of the new version of the assembly control logic via the event. This information may be captured in any suitable manner, such as by receiving this information as parameters in a callback to the executable program.

The controller 104a initiates a loading of the new version of the assembly control logic at step 310. This may include, for example, the executable program using an application programming interface (API) call to invoke loading of the new version of the assembly control logic. As a specific example, the API call could cause the code manager 212 to initiate a load of the new version of the assembly control logic into the execution environment 200. The API could be synchronous or asynchronous and could take the assembly name and version information as parameters.

The controller 104a determines whether the new version of the assembly control logic has already been loaded at step 312. This may include, for example, the code manager 212 determining if assembly control logic with the same name and version number has already been loaded into the execution environment 200. If so, the controller 104a raises an exception, and the method 300 ends. Any suitable actions can take place at this point, such as removing the new version of the assembly control logic from the live load location.

Otherwise, the controller 104a loads the new version of the assembly control logic at step 316 and compiles the new version of the assembly control logic at step 318. This may include, for example, the assembly loader 204 loading the new version of the assembly control logic into the compiler 206, which compiles the new version of the assembly control logic into native executable code. Any suitable actions can take place at this point, such as informing the executable program that loading and compilation are complete.

Although FIG. 3 illustrates one example of a method 300 for preparing for a live load of a version upgrade in a process control environment, various changes may be made to FIG. 3. For example, any other suitable technique could be used to load and compile a new version of assembly control logic. Also, while shown as a series of steps, various steps in FIG. 3 could occur in parallel or could be performed in a different order.

Figure 4A:
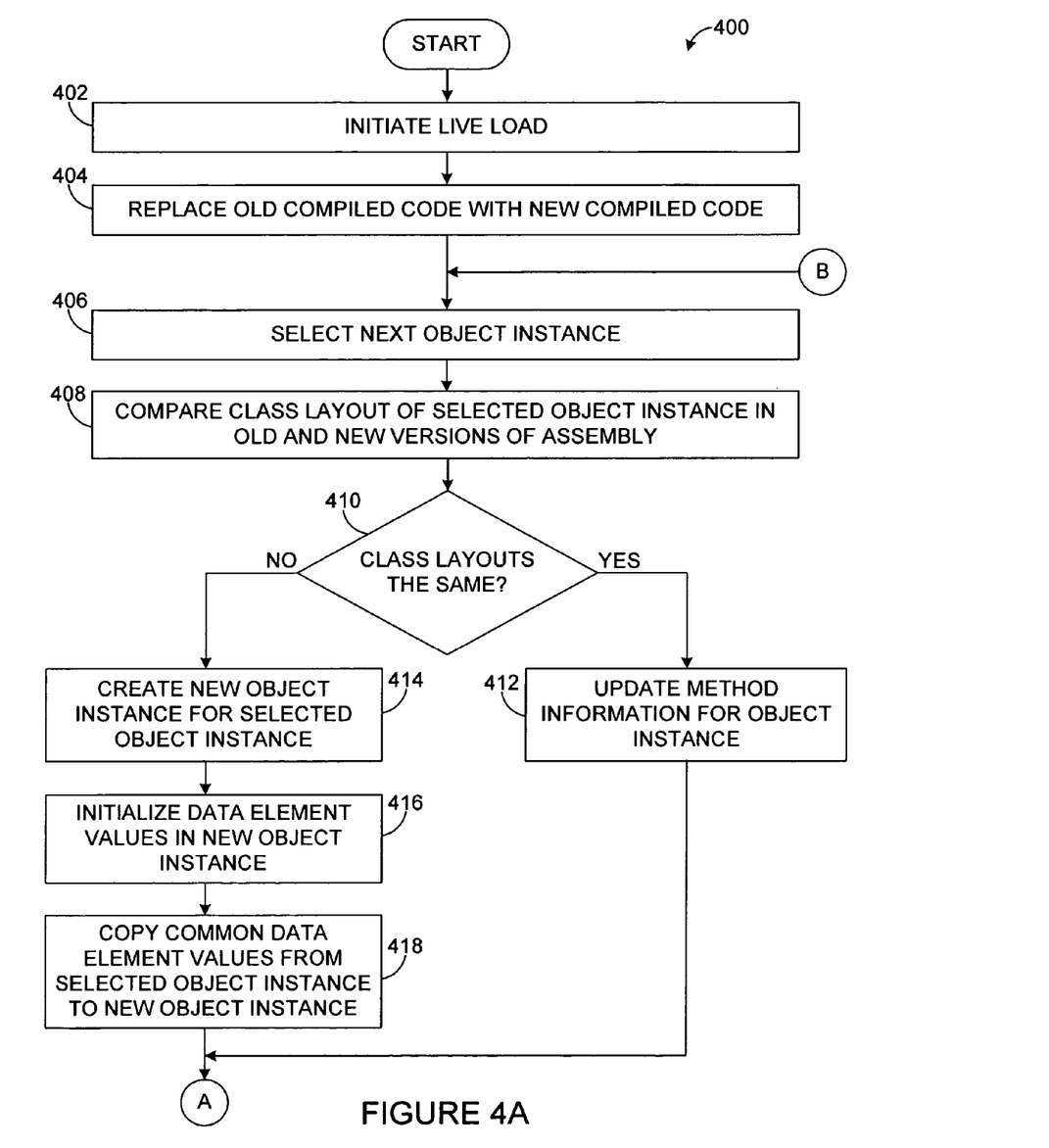
FIGS. 4A and 4B illustrate an example method for live loading of a version upgrade in a process control environment according to one embodiment of this disclosure.
Figure 4B:
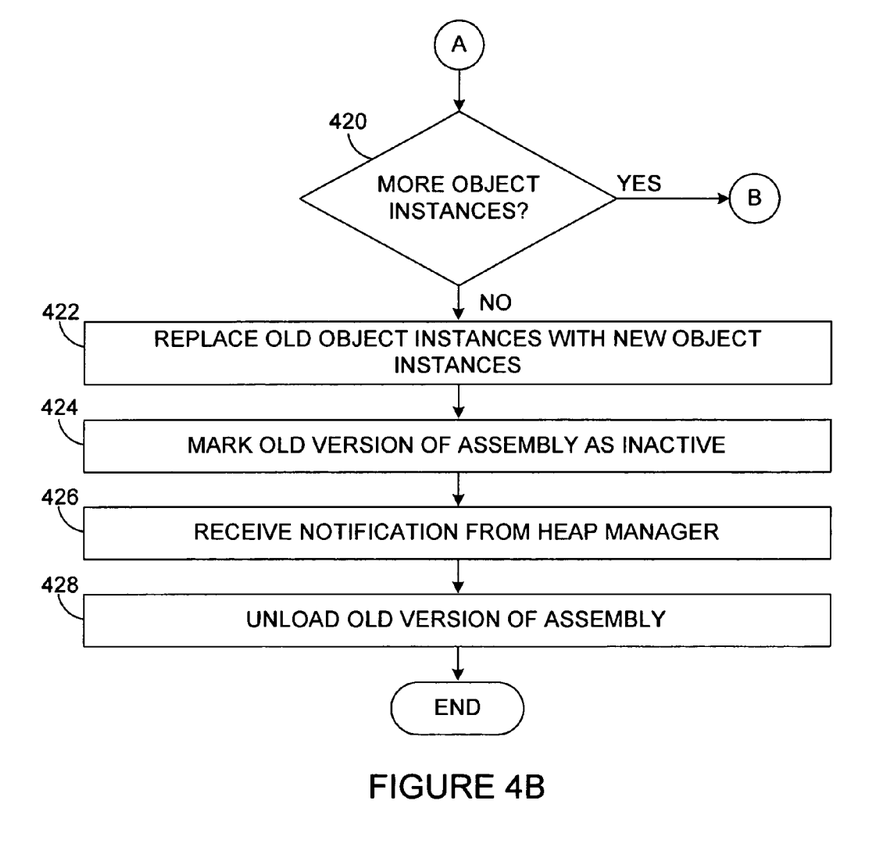

FIGS. 4A and 4B illustrate an example method 400 for live loading of a version upgrade in a process control environment according to one embodiment of this disclosure. For ease of explanation, the method 400 is described with respect to the controller 104a in the process control system 100 of FIG. 1 operating using the execution environment 200 of FIG. 2. The method 400 could be used by any other suitable device and in any other suitable system.

The steps in the method 400 may occur after the steps of the method 300 have been completed. In this example, the executable program itself decides which object instances should undergo a live load based on its own application logic. The executable program typically holds references to its own object instances, and therefore no search typically needs to be performed to locate references to these object instances. Moreover, in particular embodiments, the executable program migrates all object instances associated with the old version of assembly control logic to object instances associated with the new version of the assembly control logic.

The controller 104a initiates a live load at step 402. This may include, for example, the executable program issuing an appropriate API call to the live load controller 222. As parameters, the API could take the assembly control logic's name, an old version number, a new version number, and a list of object instances on which live load has to be performed to migrate to a new version of the assembly control logic.

The controller 104a replaces the compiled code for the old version of the assembly control logic with the compiled code for the new version of the assembly control logic at step 404. This may include, for example, the live load controller 222 causing the execution environment 200 to begin executing the native executable code for the new version of the assembly control logic in place of the native executable code for the old version of the assembly control logic.

The controller 104a selects the next object instance to be migrated at step 406. This may include, for example, the live load controller 222 selecting the next object instance from the list of object instances provided as a parameter to the API.

The controller 104a compares a first class layout for the selected object instance (as defined by a class in the old version of the assembly control logic) to a second class layout for the selected object instance (as defined by a class in the new version of the assembly control logic) at step 408. This may include, for example, the live load controller 222 determining whether the data elements defined by the class in the new version of the assembly control logic are the same as the data elements defined by the class in the old version of the assembly control logic.

If the class layouts are identical, the controller 104a updates the method information for the selected object instance at step 412. In this case, the only changes made to the class associated with the selected object instance may relate to the object instance's methods or behaviors. Therefore, only the method information for the selected object instance is updated so that the object instance now identifies the updated methods.

Otherwise, if the class layouts are different, a new object instance is created for the selected object instance at step 414. This may include, for example, the live load controller 222 creating a new object instance using the appropriate class in the new version of the assembly control logic. The data elements in the new object instance are initialized at step 416. This may include, for example, providing each data element with a user-specified default value or a default value based on the data type of that data element. The current value of each data element in the selected object instance is transferred into the corresponding data element in the new object instance at step 418. This may include, for example, the live load controller 222 reading data from the selected object instance and writing that data to the new object instance.

The controller 104a determines if additional object instances remain to be processed at step 420. This may include, for example, the live load controller 222 determining if any additional object instances remain to be processed in the list of object instances provided as a parameter to the API. If so, the controller 104a returns to step 406 to select another object instance.

Otherwise, the controller 104a returns all new object instances to the executable program, which replaces the old object instances with the new object instances at step 422. In some embodiments, switching from an old object instance to a new object instance can be performed within two execution cycles. During the first execution cycle, the executable program takes the old object instance off-line by marking it as inactive. During the second execution cycle, the executable program places the new object instance on-line by marking it as active. In particular embodiments, the old object instances may not be referenced by any code in the controller 104a, and they may be reclaimed during a later garbage collection process or other process.

The controller 104a marks the old version of the assembly control logic as inactive at step 424. This may include, for example, the executable program making an appropriate API call to mark the old version of the assembly control logic as inactive. From this point, any additional object instances are allocated using the new version of the assembly control logic.

The controller 104a receives a notification from a heap memory manager at step 426. This may include, for example, the memory manager 214 providing an indication that there are no more existing object instances that were allocated using the old version of the assembly control logic. This may occur after any existing object instances are reclaimed during garbage collection. The executable program may have previously registered to receive this notification.

The controller 104a then unloads the old version of the assembly at step 428. This may include, for example, the executable program calling the appropriate API to cause the code manager 212 to unload the old version of the assembly control logic. This may also include the code manager 212 removing the native executable code for the old version of the assembly control logic from the application domain 210.

Although FIGS. 4A and 4B illustrate one example of a method 400 for live loading of a version upgrade in a process control environment, various changes may be made to FIGS. 4A and 4B. For example, while shown as a series of steps, various steps in FIGS. 4A and 4B could occur in parallel and could be performed in a different order.

Figure 5A:
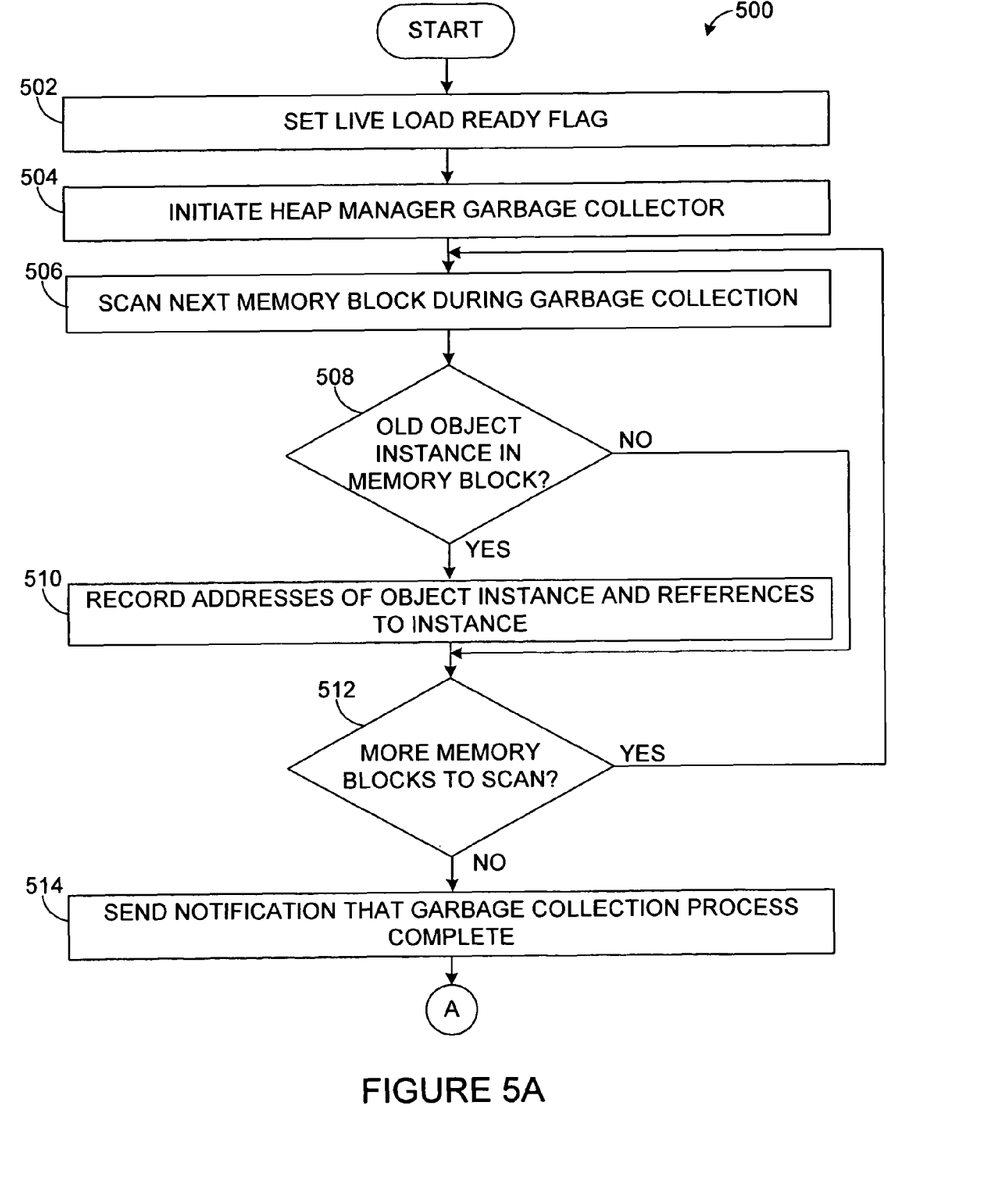
FIGS. 5A through 5C illustrate another example method for live loading of a version upgrade in a process control environment according to one embodiment of this disclosure.
Figure 5B:
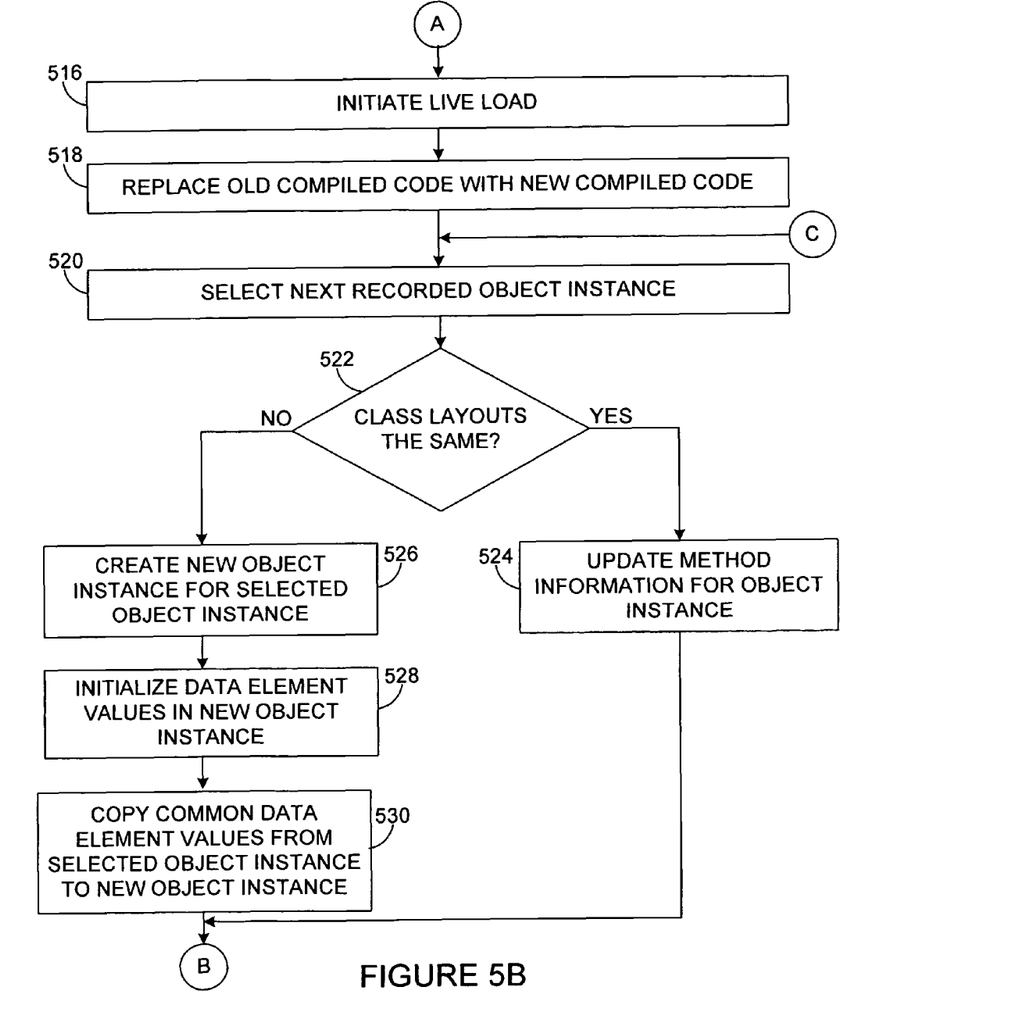
Figure 5C:
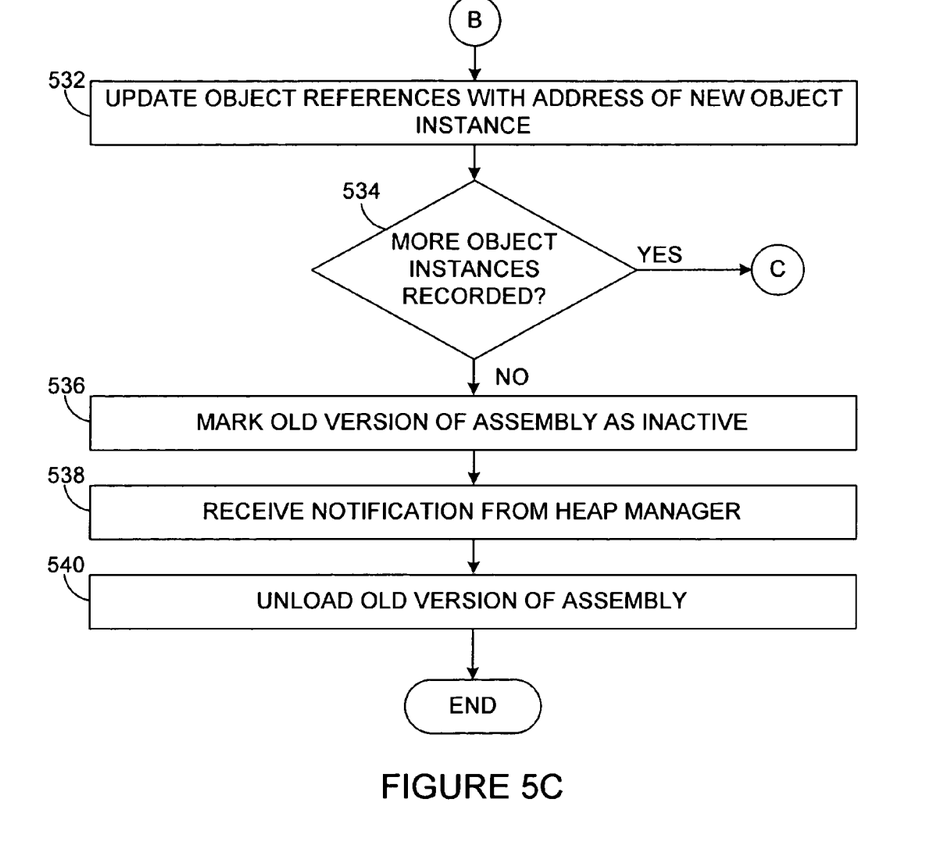

FIGS. 5A through 5C illustrate another example method 500 for live loading of a version upgrade in a process control environment according to one embodiment of this disclosure. For ease of explanation, the method 500 is described with respect to the controller 104a in the process control system 100 of FIG. 1 operating using the execution environment 200 of FIG. 2. The method 500 could be used by any other suitable device and in any other suitable system.

The steps in the method 500 may occur after the steps of the method 300 have been completed. In this example, the executable program is not aware of which object instances should undergo a live load.

The controller 104a sets a live load ready flag at step 502. This may include, for example, the executable program setting the live load ready flag to the appropriate value indicating that a live load is desired. The live load ready flag could represent any suitable type of flag or other indicator. The executable program then continues with its normal execution.

At some point, the controller 104a initiates a heap manager garbage collection process at step 504. The garbage collection process is designed to recover unused memory that has been allocated to executing programs. If the live load ready flag was not set, the garbage collection process would occur as usual. However, because the live load ready flag is set, the garbage collection process operates as follows. The controller 104a scans a memory block that is in use at step 506 and determines if that memory block contains an old object instance at step 508. This may include, for example, the memory manager 214 scanning a block of memory and using a header of the block to determine if the block contains a valid object instance. If the block contains an object instance, the memory manager 214 may determine whether the object instance was created using an old version of assembly control logic or a new version of the assembly control logic. If created using the old version of the assembly control logic, the controller 104a records the address of that object instance and any address (such as a stack address or an address of another object instance) that references this object instance.

The controller 104a determines whether more memory blocks remain to be scanned at step 512. If so, the controller 104a returns to step 506 to scan the next memory block. Otherwise, the garbage collection process is complete, and the controller 104a sends a notification indicating that the garbage collection process is complete to the executable program at step 514. The executable program may have previously registered to receive this notification.

At this point, the garbage collection process has been used to identify a set of object instances, and the method 500 continues by migrating these object instances over to new object instances (if necessary) during a live load. The remaining steps in FIGS. 5A through 5C are similar to the steps shown in FIGS. 4A and 4B.

The controller 104a initiates a live load at step 516. The controller 104a replaces the compiled code for the old version of the assembly control logic with the compiled code for the new version of the assembly control logic at step 518. The controller 104a selects the next object instance recorded during the garbage collection process at step 520. This may include, for example, the live load controller 222 selecting the next object instance from the set of object instances identified by the memory manager 214 during the garbage collection process.

The controller 104a compares first and second layouts of the selected object instance (as defined by classes in the old and new versions of the assembly control logic) at step 522. If the layouts are identical, the controller 104a updates the method information for the selected object instance at step 524. Otherwise, a new object instance is created for the selected object instance at step 526, the data elements in the new object instance are initialized at step 528, and the current value of each data element in the selected object instance is transferred into the appropriate data element in the new object instance at step 530.

The controller 104a updates references to the selected object instance at step 532. This may include, for example, the live load controller 222 using the addresses (the ones that reference the selected object instance) that were recorded in step 510. These recorded addresses are used to update references from the selected object instance to the new object instance. As a result, no references may remain to the old object instance, and the memory occupied by the old object instance may be reclaimed during a later garbage collection process or other process.

If more recorded object instances remain to be processed, the controller 104a returns to step 520. Otherwise, the controller 104a marks the old version of the assembly control logic as inactive at step 536, receives a notification from the heap memory manager that there are no more object instances allocated using the old version of the assembly control logic at step 538, and unloads the old version of the assembly control logic at step 540.

Although FIGS. 5A through 5C illustrate another example of a method 500 for live loading of a version upgrade in a process control environment, various changes may be made to FIGS. 5A through 5C. For example, while shown as a series of steps, various steps in FIGS. 5A through 5C could occur in parallel and could be performed in a different order.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The term "application" refers to one or more computer programs, sets of instructions, procedures, functions, objects, classes, instances, or related data adapted for implementation in a suitable computer language. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for dynamically upgrading one or more object instances of a running program, the method comprising:
   loading a new version of a class, the new version of the class being an updated version of an old version of the class, the old version of the class have a first layout of data elements and the new version of the class having a second layout of data elements;
   setting a flag in response to the loading of the new version of the class;
   initiating a garbage collection process that includes:
      determining if the flag is set;
      when the flag is not set, performing a normal garbage collection; and
      when the flag is set, scanning a memory where at least one or more old object instances of the running program are stored, identifying the one or more old object instances contained in the memory, and recording one or more addresses of the one or more old object instances stored in the memory and one or more references to the one or more old object instances, the one or more old object instances having been created from the old version of the class; and
   initiating a live load after the garbage collection process has recorded the one or more addresses of the one or more old object instances that includes:
   for each of the one or more recorded addresses:
      selecting the old object instance stored at the address;
      updating method information in the selected old object instance to identify one or more methods defined by the new version of the class only when the old and new versions of the class define the same data elements as determined by comparing the first and second layouts of data elements; and
      creating a new object instance from the new version of the class and transferring one or more values of one or more of the data elements from the selected old object instance to the new object instance only when the old and new versions of the class do not define the same data elements as determined by comparing the first and second layouts of data elements.

2. The method of claim 1, wherein:
   the one or more old object instances comprise a plurality of old object instances; and
   the old and new versions of assembly code are associated with an executable program.

3. The method of claim 1, wherein:
the one or more old object instances comprises a plurality of old object instances;
the old and new versions of assembly code are associated with an executable program; and
the garbage collection process is external to the executable program.

4. The method of claim 1, further comprising:
during a first execution cycle, marking the one or more old object instances as inactive; and
during a second execution cycle, marking the one or more new object instances as active.

5. The method of claim 1, further comprising:
updating the one or more references to the one or more old object instances, the one or more updated references identifying the one or more new object instances.

6. The method of claim 1, further comprising:
replacing the old version of assembly code with the new version of assembly code.

7. The method of claim 6, wherein:
the old and new versions of assembly code are associated with an executable program; and
the old and new versions of assembly code comprise dynamic link libraries.

8. The method of claim 1, further comprising:
initializing the one or more values of the one or more data elements in the one or more new object instances.

9. The method of claim 1, wherein transferring the one or more values of the one or more data elements from the one or more old object instances to the one or more new object instances comprises applying one or more conversion rules to the one or more values.

10. The method of claim 1, wherein the old and new versions of assembly code are associated with a function block algorithm executed by a controller in a process control system.

11. An apparatus, comprising:
at least one memory configured to store at least one or more old object instances of a running program created from an old version of a class, the old version of the class associated with an old version of assembly code; and
at least one processor configured to:
load a new version of the class, the new version of the class being an updated version of the old version of the class, the old version of the class have a first layout of data elements and the new version of the class having a second layout of data elements;
set a flag in response to the loading of the new version of the class;
initiate a garbage collection process that includes:
determining if the flag is set;
when the flag is not set, performing a normal garbage collection; and
when the flag is set, scanning the at least one memory, identifying the one or more old object instances contained in the at least one memory, and recording one or more addresses of the one or more old object instances stored in the at least one memory and one or more references to the one or more old object instances; and
initiate a live load after the garbage collection process has recorded the one or more addresses of the one or more old object instances that includes:
for each of the one or more recorded addresses:
selecting the old object instance stored at the address;
updating method information in the selected old object instance to identify one or more methods defined by the new version of the class only when the old and new versions of the class define the same data elements as determined by comparing the first and second layouts of data elements; and
creating a new object instance from the new version of the class and transferring one or more values of one or more of the data elements from the selected old object instance to the new object instance only when the old and new versions of the class do not define the same data elements as determined by comparing the first and second layouts of data elements.

12. The apparatus of claim 11, wherein the one or more old object instances comprise a plurality of old object instances.

13. The apparatus of claim 11, wherein the old and new versions of assembly code comprise dynamic link libraries.

14. The apparatus of claim 11, wherein the at least one processor is further operable to update the one or more references to the one or more old object instances, the one or more updated references identifying the one or more new object instances.

15. The apparatus of claim 11, wherein the at least one processor is further operable to initialize the one or more values of the one or more data elements in the one or more new object instances.

16. The apparatus of claim 11, wherein the at least one processor is operable to transfer the one or more values of the one or more data elements from the one or more old object instances to the one or more new object instances by applying one or more conversion rules to the one or more values.

17. The apparatus of claim 11, wherein the at least one processor is further operable to:
during a first execution cycle, mark the one or more old object instances as inactive; and
during a second execution cycle, mark the one or more new object instances as active.

18. A non-transitory computer readable medium embodying a computer program, the computer program comprising computer readable program code, the computer readable program code when executed by a processor configured to perform a method of:
loading a new version of a class, the new version of the class being an updated version of an old version of the class, the old version of the class have a first layout of data elements and the new version of the class having a second layout of data elements;
setting a flag in response to the loading of the new version of the class;
initiating a garbage collection process that includes:
determining if the flag is set;
when the flag is not set, performing a normal garbage collection; and
when the flag is set, scanning a memory where at least one or more old object instances of the running program are stored, identifying the one or more old object instances contained in the memory, and recording one or more addresses of the one or more old object instances stored in the memory and one or more references to the one or more old object instances, the one or more old object instances having been created from the old version of the class; and
initiating a live load after the garbage collection process has recorded the one or more addresses of the one or more old object instances that includes:

for each of the one or more recorded addresses:

selecting the old object instance stored at the address;

updating method information in the selected old object instance to identify one or more methods defined by the new version of the class only when the old and new versions of the class define the same data elements as determined by comparing the first and second layouts of data elements; and     creating a new object instance from the new version of the class and transferring one or more values of one or more of the data elements from the selected old object instance to the new object instance only when the old and new versions of the class do not define the same data elements as determined by comparing the first and second layouts of data elements.

19. The computer readable medium of claim 18, wherein the one or more old object instances comprises a plurality of old object instances.

20. The computer readable medium of claim 18, wherein the old and new versions of assembly code comprise dynamic link libraries.

21. The computer readable medium of claim 18, further comprising computer readable program code for updating the one or more references to the one or more old object instances, the one or more updated references identifying the one or more new object instances.

* * * * *